Patented July 7, 1936

2,046,757

UNITED STATES PATENT OFFICE 2,046,757

AQUEOUS DISPERSION OF CARBON BLACK

George R. Tucker, North Andover, Mass.; Charles W. Tucker, administrator of said George R. Tucker, deceased, assignor to Dewey and Almy Chemical Company, Cambridge, Mass., a corporation of Massachusetts No Drawing. Application November 28, 1932, Serial No. 644,683

14 Claims. (Cl. 134—58)

This invention relates to the dispersion of carbon black in an aqueous medium, and generally comprises the use of a dispersing agent of the general structure obtained by condensing an aromatic sulfonic acid, or a derivative thereof, with formaldehyde, or its equivalent, a process and a product thereof, all as hereinafter more fully described and claimed.

There are many industrial applications of carbon black which require its suspension or dispersion in an aqueous medium. Thus, for example, it is frequently used as a pigment in the preparation of black paper or paper-like materials in which case the carbon black may be slurried in water and added as a paste or thin slurry to the stock in a paper beater. In this manner carbon black is commonly added to aqueous slurries of asbestos which are to be used for the manufacture of asbestos board, gasket materials, and the like. Aqueous dispersions of carbon black are frequently added to rubber latex to provide a compounding and pigmenting agent for the rubber constituent thereof. Black concrete or cement is commonly prepared by mixing carbon black with the cement or mortar when in the wet state. Furthermore, it has been proposed, and the process presents much promise, to use a dispersion of carbon black in an aqueous medium as a printing ink in place of the printing inks ordinarily used consisting of carbon black and a suitable oil.

The dispersion of carbon black in water presents difficulties, however, and these difficulties have militated against its more general and otherwise advantageous use. If carbon black is stirred into water, it will be found that the particles are not readily wet by the water and, once wetted, they tend to cling together, i. e. agglomerate, and do not disperse in the aqueous medium as colloidal particles of carbon black.

These non-wetting and non-dispersing characteristics constitute serious disadvantages in the practical use of carbon black when suspended in water because carbon black is generally used for its tinctorial power; and, as is well known and recognized, the tinctorial power of a finely divided material is proportional to the size of the individual particles and the completeness with which they are dispersed.

Attempts have been made to overcome the stated difficulties by adding certain protective colloids to the water in which the carbon black was to be suspended. For this purpose there have been employed soaps, such as sodium stearate or oleate, and proteins, such as casein, hemoglobin, or albumen. While these agents are generally very effective to disperse most finely divided pigments in water, carbon black presents unusual difficulties and is not particularly well dispersed by them. This is believed to be due to the fact that carbon black particles are very much smaller than, in fact of a different order of magnitude from that of, the particles of ordinary pigments. Furthermore, soaps and proteins are in themselves attended with certain disadvantages. In order to be effective they must be used in relatively large quantities; and, furthermore, they lose their effectiveness and are precipitated when brought in contact with acid environments or the ions of heavy metal salts. The latter disadvantages render soaps or proteins particularly ineffective to disperse carbon black in water for use in cement or mortar; or in paper-making when an acid or alum size is employed; or for use with aqueous slurries of asbestos such as are commonly encountered in the manufacture of asbestos board, gasket material, and the like, which slurries, owing to the inherent chemical nature of the asbestos, always contain calcium and magnesium ions. Similarly, dispersions of carbon black in water prepared with the aid of soaps or proteins are also especially ineffective for use in connection with the general process described in my Patent No. 1,956,053, issued April 24, 1934, in which a watery slurry of asbestos is treated with an aqueous dispersion of electropositive rubber particles which dispersion may be acid in reaction or may contain polyvalent metal ions.

An object of this invention is to provide a suspension of carbon black in water in which the carbon black is more completely dispersed and which therefore possesses greater tinctorial power than has heretofore been possible. Another object of the invention is to provide a dispersion of carbon black in water which is not readily aggregated or flocculated by acids or polyvalent metal ions such as are provided by the acid sizes employed in paper-making; by the asbestos of asbestos-water slurries employed in the manufacture of asbestos board, gasket material, and the like; by the heavy metal ions encountered in ordinary cement or mortar; or by the electropositive rubber dispersions employed in the general process described in my before mentioned Patent No. 1,956,053, issued April 24, 1934. Still another object of the invention is to provide aqueous carbon black dispersions of greater concentration and greater fluidity or plasticity at a given high concentration than has heretofore been attainable. Other objects and advantages of the invention will become apparent with its more detailed description.

I have discovered that the disadvantages of the prior art are overcome and the foregoing objects are attained if carbon black is dispersed in water containing dissolved therein a small quantity of one or more members of the class of aromatic compounds of the general structure obtained by condensing sulfonic acids of aromatic hydrocarbons or their derivatives, with formaldehyde or its equivalent. These compounds may be looked upon as derivatives of polyaryl alkyls or their homologues and may be expressed by the general graphical formula (A—R—A')SO₃M in which A and A' designate two or more aromatic groups—which may or may not be alike; which are joined to an aliphatic nucleus R which may consist of a single alkyl group or a plurality of alkyl groups associated in straight chain or branched chain formation; and in which SO₃M designates at least one solubilizing group such as the free sulfonic acid group or a sulfonic acid group in combination with a soluble salt-forming radical. The members of the class may be synthesized either by direct sulfonation of a hydrocarbon or a derivative thereof which possesses the necessary configuration of at least two aromatic nuclei joined to an aliphatic nucelus, or, as is usually more convenient and commercially practical, by causing an aromatic sulfonic acid or a derivative thereof to react with formaldehyde or its equivalent, preferably in the ratio of approximately two mols. of aromatic sulfonic acid for each mol of aldehyde. The member of the family which I prefer to employ because it is cheap and very effective for present purposes may be obtained by condensing beta-naphthalene sulfonic acid with formaldehyde. While the beta-naphthalene sulfonic acid condensation product may be prepared in known ways, I find that the product obtained by the following procedure possesses highly satisfactory properties for use in practicing my invention.

To 100 parts of concentrated sulfuric acid (specific gravity 1.84) contained in a suitable sulfonator and maintained at 160° C. are added slowly with stirring 100 parts of refined naphthalene. After all of the naphthalene has been introduced (this operation generally requires about one hour), the mass is stirred at 160° C. for four hours longer or until a test shows that substantially none of the naphthalene remains unsulfonated. The sulfonation mixture is then cooled to about 100° C. and diluted with 44 parts of water to prevent solidification on subsequent cooling. The diluted material is further cooled to 80° C. at which temperature 12 parts of a 40% aqueous solution of formaldehyde are added. This mixture is then stirred for three hours longer at 80° C.; but at the end of each successive hour there are added 12 parts more of formaldehyde solution, making a total at the end of the three hours of four portions or 48 parts in all. After all the formaldehyde has been added, the temperature is progressively raised over a period of one hour to 95-100° C. where it is maintained for 18 hours, while the mass is constantly stirred, or until the control test described later on in this specification shows that a product of optimum effectiveness has been obtained. Experience has shown that when pure naphthalene is used, a final heating period of 18 hours yields the best product. Soon after the temperature has been raised to 95-100° C., it is found that substantially none of the aldehyde remains unconsumed in the condensation reaction. During the later stages of the 18-hour heating period, the mixture progressively thickens until at the end it generally reaches the consistency of thick molasses. If this thickening becomes so great, however, as to prevent proper stirring, a small quantity of water may be added to keep the material liquid. After the heating is completed, the mixture is cooled, neutralized with a suitable alkali, e. g. sodium hydroxide, and, if desired, dried. It is then ready for use.

A somewhat purer and better product can be obtained by diluting the viscous reaction mass with about three times its volume of water (the amount is not important so long as it is sufficient to permit convenient handling in the subsequent filtering operation), and neutralizing with lime. For the latter purpose I generally use an aqueous paste or suspension of hydrated or slaked lime. The neutralized slurry is filtered hot to remove the calcium sulfate precipitate which forms from the interaction of the lime and sulfuric acid unconsumed in the sulfonation reaction; and to the filtrate is added the requisite amount of sodium carbonate quantitatively to convert the calcium salt of the desired sulfonic acid into its sodium salt. The resulting calcium carbonate precipitate may then be removed by filtration and the filtrate which contains the desired ingredient evaporated to dryness according to any of the well known drying procedures.

The sulfonation of the naphthalene may be conducted in a cast iron vessel; but the reaction with formaldehyde is preferably carried out in enameled or lead-lined apparatus.

In place of naphthalene in the foregoing sulfonation and condensation procedure may be employed, as more fully described in the previously mentioned Patent No. 1,956,053, issued April 24, 1934, any aromatic hydrocarbon such as benzene, diphenyl, anthracene, phenanthrene, fluorene, etc., or any homologue or derivative thereof. When such substitutions are made, however, it is generally necessary to modify the sulfonation and condensation procedure; but these modifications, which vary with each compound, will be apparent to those skilled in the art. Products derived from the benzene series, however, are less effective than materials derived from polynuclear aromatic hydrocarbons or their derivatives. Alkylated aromatic compounds such as, for example, as afforded by the sulfonic acids of xylene, cumene, ethyl naphthalene, or retene generally lead to products which are more effective than similar but unsubstituted compounds. Thus the condensation product obtained from xylene sulfonic acid is more effective for present purposes than the one obtained from the simpler benzene derivative. But whereas condensation products prepared from alkylated compounds are especially desirable for use in the broader aspects of this invention, they may be objectionable for some purposes because, due to their tendency to reduce the surface tension of water, they promote the formation of foam in the carbon black dispersion. Materials made from aromatic compounds which are free from substituting alkyl groups have substantially no tendency to reduce the surface tension of water; and for this reason carbon black dispersions prepared with them do not have the undesirable tendency to form foam possessed by aqueous dispersions of carbon black prepared with the aid of prior agents which, unlike present materials, generally rely for their effectiveness on their ability to reduce the surface tension of water. The product obtained as described above by the reaction of naphthalene sulfonic acid with formaldehyde is specifically recommended for use in a preferred form of this invention where the tendency to produce foam is objectionable.

In the chemical reaction which occurs between an aromatic sulfonic acid and formaldehyde or its equivalent, it is my theory that the initial condensation reaction is followed by a progressive polymerization of the resulting condensed material, and that a certain optimum molecular weight is necessary to yield the best results for present purposes as determined according to the indicated empirical test given later on in this specification; but this theory forms no part of my definition and I do not desire to be bound by it.

Whereas I generally use the sulfonic acids of the herein defined class in the form of their sodium salts, any water-soluble salt or derivative, or even the free acid, may be employed. Salts of monovalent metals, particularly the alkali metals, are preferable, however, to salts of polyvalent metals.

In accordance with the present invention, aqueous dispersions of carbon black may be prepared by merely stirring the material into a solution of the effective agent. This mixing operation is conveniently carried out in a tank provided with a suitable agitator; but if maximum dispersion of the carbon black in highest concentration is to be obtained, the mixing should be carried out in a ball or so-called colloid mill.

If maximum dispersing effect is to be obtained, a solution should be used for preparing the mixture which contains a quantity of dispersing agent equal to about 4% of the weight of the carbon black employed. In this connection, however, it may be said further that different kinds of carbon black require different quantities of dispersing agent under otherwise like conditions to produce an optimum dispersing effect. With most carbon blacks the optimum dispersing effect will be obtained when a quantity of dispersing agent equal to 2–6% of the weight of carbon black is employed; but some samples, i. e. those of extremely small particle size, require a minimum of 4–8% to produce the best results. It is believed that the relative quantity of dispersing agent essential to produce a given result is dependent on the size and/or specific surface of the carbon black particles to be dispersed. This is in accord with the observation that a "thermatomic" carbon black which possesses an ultra-microscopic particle size requires for a unit weight a larger quantity of dispersing agent to produce a given result than does a carbon black known to be of larger particle size. If a larger quantity of dispersing agent is employed than that necessary to produce the optimum result with any given carbon black, the excess of dispersing agent does no material harm but is of no advantage. The minimum quantity of agent required to produce the optimum result may readily be determined by trial. For example, 25-gram portions of the carbon black to be tested may be vigorously stirred into 75-cubic-centimeter portions of solutions containing, respectively, ½, 1, 1½, and 2 grams of the dispersing agent. The minimum quantity of agent essential to produce a paste having the maximum fluidity or least viscosity should be chosen. As previously stated, this test is also useful to ascertain and control the optimum degree of polymerization of products made according to the general procedure given above as well as to determine the relative value for present purposes of any material which falls within the scope of the appended claims.

In the practice of this invention instead of mixing the carbon black with a solution of the dispersing agent, carbon black may be mixed with the dispersing agent in the dry and powdered state and the resulting dry mixture may be stirred into water or an aqueous medium, the dispersing agent dissolving in the watery liquor to provide the desired peptizing influence. While this process has advantages for some purposes, it does not, however, give as good a result as is obtained by mixing the carbon black into a previously prepared solution of dispersing agent; and it is necessary to use a relatively larger quantity of dispersing agent to produce in like degree the dispersing effect that would be obtained by stirring the carbon black into a solution containing a lesser quantity of dissolved dispersing agent.

When it is desired to produce relatively dilute dispersions of carbon black in water, it is usually desirable first to prepare a dispersion of the carbon black in high concentration and then to dilute with water to the desired value. This procedure is preferable both when the carbon black is stirred into a solution of the dispersing agent and when a dry mixture of carbon black and dispersing agent is added to water.

Carbon black dispersions prepared in accordance with the present invention are more fluid or plastic than dispersions similarly prepared but with the aid of no or other dispersing agents known to me. In this connection it may be said that different carbon blacks dispersed in an aqueous medium give dispersions exhibiting widely different consistencies at any given concentration. The process of the present invention will always yield, however, so far as I am aware, a dispersion possessing greater fluidity or plasticity at any given concentration than can be obtained under like conditions with other dispersing agents. Dispersions of ordinary carbon black prepared in accordance with the present invention and containing as much as 25% by weight of dispersed material are quite fluid. Dispersions containing between 30 and 40% of carbon black are of more or less plastic or pasty consistency. However, it is possible with some carbon blacks to prepare in accordance with the present invention dispersions containing from 40 to 50% of dispersed material which are of a smooth, pasty consistency. In the absence of any dispersing agent, or in the presence of most dispersing agents, it is not generally possible to go beyond 25–30% of carbon black without obtaining a "dry" crumbly product.

If a carbon black dispersion prepared in accordance with the present invention is diluted with water and examined under the microscope at a high magnification (900 diameters), minute particles will be observed suspended in the watery medium and engaging in rapid Brownian motion. In contradistinction to dispersions generally prepared with the aid of other dispersing agents, it will be found that the addition of small quantities of acids, or of salts providing heavy metal ions, to carbon black dispersions prepared according to the present invention will not markedly aggregate or flocculate the dispersed particles thereof. This fact makes the process of this invention particularly valuable for dispersing carbon black in acid environments or in the presence of heavy metal ions normally coagulative of colloidally dispersed material.

The term "carbon black" as employed herein is used in a broad generic sense which is intended to embrace finely divided carbon such as lamp black as well as the materials more commonly referred to as carbon blacks.

It should be understood that the present disclosure is for the purpose of illustration only and that this invention includes all modifications and equivalents which fall within the scope of the appended claims.

This application contains subject matter in common with my application Ser. No. 644,684, filed November 23, 1932.

I claim:

1. The process of dispersing carbon black in an aqueous medium which comprises agitating carbon black in an aqueous solution of a dispersing agent obtained by condensing formaldehyde with an aromatic sulfonic acid, whereby deflocculation of the normally aggregated particles of carbon black occurs, said agent being present in amount of substantially 2 to 8% based on the weight of the dry carbon black.

2. The process of dispersing carbon black in an aqueous medium which comprises agitating carbon black in an aqueous solution of a dispersing agent obtained by condensing formaldehyde with a polynuclear aromatic sulfonic acid, whereby deflocculation of the normally aggregated particles of carbon black occurs, said agent being present in amount of substantially 2 to 8% based on the weight of the dry carbon black.

3. The process of dispersing carbon black in an aqueous medium which comprises agitating carbon black in an aqueous solution of a dispersing agent having a plurality of aromatic nuclei joined to a methylene nucleus, whereby deflocculation of the normally aggregated particles of carbon black occurs, said agent being present in amount of substantially 2 to 8% based on the weight of the dry carbon black.

4. The process of dispersing carbon black in an aqueous medium which comprises agitating carbon black in an aqueous solution of a dispersing agent comprising a salt of a sulfonic acid compound having a plurality of polynuclear aromatic nuclei joined to a methylene nucleus, whereby deflocculation of the normally aggregated particles of carbon black occurs, said agent being present in amount of substantially 2 to 8% based on the weight of the dry carbon black.

5. As a new composition of matter, an aqueous dispersion of carbon black which contains dissolved in the aqueous medium a dispersing agent obtained by condensing formaldehyde with an aromatic sulfonic acid, said agent being present in amount of substantially 2 to 8% based on the weight of the dry carbon black.

6. As a new composition of matter, dry carbon black in intimate admixture with substantially 2 to 8% based on the weight of the dry carbon black of a water-soluble dispersing agent obtained by condensing formaldehyde with an aromatic sulfonic acid.

7. As a new composition of matter, an aqueous dispersion of carbon black which contains dissolved in the aqueous medium a dispersing agent obtained by condensing formaldehyde with a polynuclear aromatic sulfonic acid, said agent being present in amount of substantially 2 to 8% based on the weight of the dry carbon black.

8. As a new composition of matter, dry carbon black in intimate admixture with substantially 2 to 8% based on the weight of the dry carbon black of a water-soluble dispersing agent obtained by condensing formaldehyde with a polynuclear aromatic sulfonic acid.

9. As a new composition of matter, an aqueous dispersion of carbon black which contains dissolved in the aqueous medium a dispersing agent having a plurality of aromatic nuclei joined to a methylene nucleus, said agent being present in amount of substantially 2 to 8% based on the weight of the dry carbon black.

10. As a new composition of matter, dry carbon black in intimate admixture with substantially 2 to 8% based on the weight of the dry carbon black of a water-soluble dispersing agent having a plurality of aromatic nuclei joined to a methylene nucleus.

11. As a new composition of matter, an aqueous dispersion of carbon black which contains dissolved in the aqueous medium a dispersing agent comprising a sulfonic acid compound having a plurality of aromatic nuclei joined to a methylene nucleus, said agent being present in amount of substantially 2 to 8% based on the weight of the dry carbon black.

12. As a new composition of matter, dry carbon black in intimate admixture with substantially 2 to 8% based on the weight of the dry carbon black of a water-soluble sulfonic acid dispersing agent having a plurality of aromatic nuclei joined to a methylene nucleus.

13. A water dispersable carbon black mixture comprising a pasty mass of carbon black, water in amount to produce a paste, and 2 to 8% based on the weight of the dry carbon black of a dispersing agent comprising the formaldehyde condensation product of a sulphonated aromatic compound, said paste mixture upon dilution with water having the carbon black particles in colloidally dispersed condition.

14. A water dispersable carbon black mixture comprising a plastic mass of carbon black, water in amount to produce a plastic mixture, and 2 to 8% based on the weight of the dry carbon black of a dispersing agent comprising the formaldehyde condensation product of a sulphonated aromatic compound, said plastic mixture upon dilution with water having the carbon black particles in colloidally dispersed condition.

GEORGE R. TUCKER.